United States Patent
Kim et al.

(10) Patent No.: US 10,061,808 B2
(45) Date of Patent: Aug. 28, 2018

(54) CACHED VIEWS

(71) Applicants: Ki Hong Kim, Seoul (KR); Norman May, Karlsruhe (DE); Alexander Boehm, Sandhausen (DE); Sung Heun Wi, Gyeonggi (KR); Jeong Ae Han, Seoul (KR); Sang Il Song, Seoul (KR); Yongsik Yoon, Walldorf (DE)

(72) Inventors: Ki Hong Kim, Seoul (KR); Norman May, Karlsruhe (DE); Alexander Boehm, Sandhausen (DE); Sung Heun Wi, Gyeonggi (KR); Jeong Ae Han, Seoul (KR); Sang Il Song, Seoul (KR); Yongsik Yoon, Walldorf (DE)

(73) Assignee: SAP SE, Walldorf (DE)

( * ) Notice: Subject to any disclaimer, the term of this patent is extended or adjusted under 35 U.S.C. 154(b) by 620 days.

(21) Appl. No.: 14/294,818

(22) Filed: Jun. 3, 2014

(65) Prior Publication Data
US 2015/0347410 A1 Dec. 3, 2015

(51) Int. Cl.
*G06F 17/30* (2006.01)

(52) U.S. Cl.
CPC .... *G06F 17/3048* (2013.01); *G06F 17/30418* (2013.01)

(58) Field of Classification Search
CPC .......... G06F 17/3048; G06F 17/30424; G06F 17/30657; G06F 17/30929; G06F 17/30979
See application file for complete search history.

(56) References Cited

U.S. PATENT DOCUMENTS

| | | | |
|---|---|---|---|
| 5,915,249 A * | 6/1999 | Spencer | G06F 17/30616 707/742 |
| 9,098,587 B2 * | 8/2015 | Deshmukh | G06F 17/30864 |
| 9,329,758 B2 * | 5/2016 | Guzak | G06F 3/0484 |

(Continued)

OTHER PUBLICATIONS

Muller et al., Efficient Aggregate Cache Revalidation in an In-Memory Column Store, University of Potsdam, Germany, 2014, 8 pages.*

(Continued)

*Primary Examiner* — Noosha Arjomandi
(74) *Attorney, Agent, or Firm* — Fountainhead Law Group P.C.

(57) ABSTRACT

Embodiments relate to view caching techniques that cache for a limited time, some of the (intermediate) results of a previous query execution, in order to avoid expensive re-computation of query results. Particular embodiments may utilize a cache manager to determine whether information relevant to a subsequent user request can be satisfied by an existing cache instance or view, or whether creation of an additional cache instance is appropriate. At design time, cache defining columns of a view are defined, with user input parameters automatically being cache defining. Cache instances are created for each tuple of literals for the cache defining columns, and for each explicit or implicit group by clause. Certain embodiments may feature enhanced reuse between cache instances, in order to limit memory footprint. Over time a cache instances may be evicted from memory based upon implementation of a policy such as a Least Recently Used (LRU) strategy.

14 Claims, 12 Drawing Sheets

(56) References Cited

U.S. PATENT DOCUMENTS

| | | | |
|---|---|---|---|
| 9,934,279 B2* | 4/2018 | Kali | G06F 17/30516 |
| 2002/0099807 A1* | 7/2002 | Doyle | G06F 17/30902 709/223 |
| 2002/0184364 A1* | 12/2002 | Brebner | G06F 11/3438 709/224 |
| 2006/0004794 A1* | 1/2006 | Pizzo | G06F 17/30418 |
| 2006/0026154 A1* | 2/2006 | Altinel | G06F 17/3048 |
| 2006/0085489 A1* | 4/2006 | Tomic | G06F 12/123 |
| 2006/0161541 A1* | 7/2006 | Cencini | G06F 17/30902 |
| 2007/0208690 A1* | 9/2007 | Schneider | G06F 17/30483 |
| 2008/0222111 A1* | 9/2008 | Hoang | G06F 17/30289 |
| 2009/0327255 A1* | 12/2009 | Larson | G06F 17/30457 |
| 2010/0005054 A1* | 1/2010 | Smith | G06F 17/30498 707/E17.002 |
| 2010/0027545 A1* | 2/2010 | Gomes | H04L 45/00 370/392 |
| 2012/0239869 A1* | 9/2012 | Chiueh | G06F 12/0246 711/103 |
| 2012/0303901 A1* | 11/2012 | Chen | G06F 12/0806 711/126 |
| 2012/0310918 A1* | 12/2012 | Johri | G06F 17/30457 707/714 |
| 2013/0086039 A1* | 4/2013 | Salch | G06F 17/30463 707/717 |
| 2013/0173539 A1* | 7/2013 | Gilder | G06F 17/30578 707/622 |
| 2013/0198232 A1* | 8/2013 | Shamgunov | G06F 17/30545 707/770 |
| 2013/0205362 A1* | 8/2013 | Kiehtreiber | G06F 21/51 726/1 |
| 2013/0339470 A1* | 12/2013 | Jeswani | H04L 67/1097 709/213 |
| 2014/0040182 A1* | 2/2014 | Gilder | G06F 17/30578 707/602 |
| 2014/0095471 A1* | 4/2014 | Deshmukh | G06F 17/30463 707/714 |
| 2014/0095508 A1* | 4/2014 | Pytel | G06F 17/30457 707/740 |
| 2014/0122634 A1* | 5/2014 | Conner | G06F 13/4027 709/212 |
| 2014/0172908 A1* | 6/2014 | Konik | G06F 17/30477 707/769 |
| 2014/0279838 A1* | 9/2014 | Tsirogiannis | G06F 17/30292 707/603 |
| 2014/0330780 A1* | 11/2014 | Chen | G06F 17/30575 707/625 |
| 2015/0227624 A1* | 8/2015 | Busch | G06F 17/30982 707/728 |

OTHER PUBLICATIONS

Guo et al., Cooperative Local Caching Under Heterogeneous File Preferences, 2015, 14 pages.*

* cited by examiner

| Dimensions (Characteristics) | | | | Measures (Key figures) | |
|---|---|---|---|---|---|
| Client | Product | Country | Period | Revenue | Profit |
| 900 | - | DE | 201301 | ... | ... |
| 900 | - | DE | 201302 | ... | ... |
| ⋮ | ⋮ | ⋮ | ⋮ | ⋮ | ⋮ |
| 900 | - | DE | 201303 | ... | ... |
| 900 | - | KR | - | ... | ... |
| 900 | ERP | - | - | ... | ... |
| 900 | CRM | - | - | ... | ... |
| 900 | BW | - | - | ... | ... |

1. (rows with Country DE)
2. (row with Country KR)
3. (rows with Product ERP/CRM/BW)

Note: Dimensions can be used as the primary key of the above cache

→ Run a query to get the following result. Then, add to the cached view

| 900 | ERP | - | 201302 | ... | ... |
| 900 | ERP | - | 201302 | ... | ... |
| 900 | ERP | - | 201303 | ... | ... |

4.

→ Run a query to get the following result. Then, do UPSERT

| 900 | - | DE | - | ... | ... |
| 900 | - | KR | - | ... | ... |
| 900 | - | US | - | ... | ... |

CACHED VIEWS

BACKGROUND

Embodiments relate to accessing data from a database, and in particular, to methods and systems providing cached views.

Unless otherwise indicated herein, the approaches described in this section are not prior art to the claims in this application and are not admitted to be prior art by inclusion in this section.

Databases have evolved to afford both increased capacity and complexity of the data structures that may be stored. As a result, customers can run complex queries on database tables from the application layer, without changing the underlying data model.

Instead, databases such as in memory database architectures may rely upon complex models that join, project, and aggregate the existing tables using relational operators in order to provide insights to the business user. These models and resulting database queries may implicate up to hundreds of database tables, and produce very large intermediate results in the realm of even billions of records.

Depending on the usage pattern of an overlying application building upon such a database, such complex queries can be run in a high frequency, producing a large query workload for the underlying database management system. In order to reduce this workload, and avoid expensive query re-computation, some database management systems may employ caching techniques. With the advent of more powerful database technology, however, such traditional caching techniques may still result in the database management system being forced to handle large data volumes.

Accordingly, there is a need for apparatuses and methods that performing improved caching approaches.

SUMMARY

Embodiments relate to view caching techniques that cache for a limited time, some of the (intermediate) results of a previous query execution, in order to avoid expensive re-computation of query results. Particular embodiments may utilize a cache manager to determine whether information relevant to a subsequent user request can be satisfied by an existing cache instance or view, or whether creation of an additional cache instance is appropriate. At design time, cache defining columns of a view are defined, with user input parameters automatically being cache defining. Cache instances are created for each tuple of literals for the cache defining columns, and for each explicit or implicit group by clause. Certain embodiments may feature enhanced reuse between cache instances, in order to limit memory footprint. Over time a cache instances may be evicted from memory based upon implementation of a policy such as a Least Recently Used (LRU) strategy.

An embodiment of a computer-implemented method comprises causing an engine to receive a query including parameters. The engine is caused to determine if the parameters match cache-defined columns If a parameter does not match a cache-defined column, a query result is returned satisfied by a view from an underlying database. If the parameters match the cache-defined columns, the engine is caused to determine if an existing cache instance satisfies the query. If a cache instance does not satisfy the query, causing the engine to create a new cache instance with a view from the underlying database, and returning the query result with the new cache instance. If the existing cache instance satisfies the query, causing the engine to return the query result with the existing cache instance.

A non-transitory computer readable storage medium embodies a computer program for performing a method comprising causing an engine to receive a query including parameters, and causing the engine to determine if the parameters match cache-defined columns. If a parameter does not match a cache-defined column, a query result is returned satisfied by a view from an underlying database. If the parameters match the cache-defined columns, the engine determines if an existing cache instance satisfies the query. If a cache instance does not satisfy the query, the engine is caused to create a new cache instance with a view from the underlying database, and return the query result with the new cache instance. If the existing cache instance satisfies the query, the engine is caused to return the query result with the existing cache instance.

An embodiment of a computer system comprises one or more processors and a software program, executable on said computer system. The software program is configured to cause an engine to receive a query including parameters, and to cause the engine to determine if the parameters match cache-defined columns If a parameter does not match a cache-defined column, a query result is returned satisfied by a view from an underlying database. If the parameters match the cache-defined columns, the engine is caused to determine if an existing cache instance satisfies the query. If a cache instance does not satisfy the query, the engine is caused to create a new cache instance with a view from the underlying database, and return the query result with the new cache instance. If the existing cache instance satisfies the query, the engine is caused to return the query result with the existing cache instance.

In certain embodiments the existing cache instance satisfies the query when a same grouping is used.

According to some embodiments the existing cache instance satisfies the query when a same explicit group-by clause is used.

In various embodiments the existing cache instance satisfies the query when a same requested column list is used.

In particular embodiments the new cache instance is created for each tuple of literals for a plurality of cache-defined columns Certain embodiments may further comprise evicting the existing cache instance after a period of time.

In some embodiments the evicting may be based upon a Least Recently Used (LRU) strategy.

The following detailed description and accompanying drawings provide a better understanding of the nature and advantages of embodiments.

BRIEF DESCRIPTION OF THE DRAWINGS

FIG. 4 shows a specific example of the implementation of view caching according to an embodiment.

DETAILED DESCRIPTION

Figure 1:
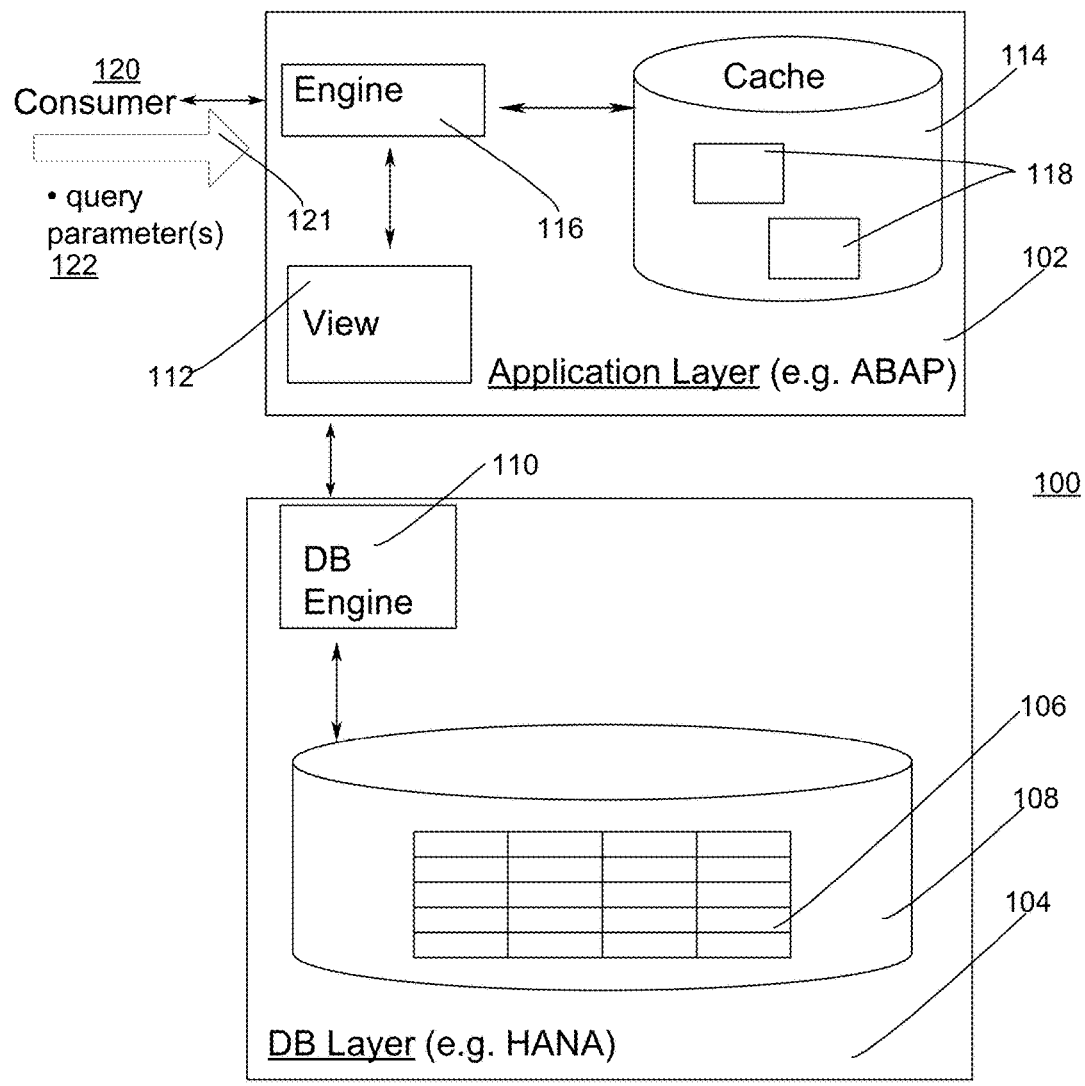
FIG. 1 illustrates a system configured to perform view caching according to one embodiment.

Described herein are techniques for performing view caching according to an embodiment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments employ materialized views to store the result of a particular query, for example as a temporary table. When a query including a materialized view as a subset of the query graph is received, the manager accesses the materialized view instead of re-computing the result of the query graph subset on the fly, thereby reducing computation effort.

Particular embodiments allow definition at design time, of a set of parameters (cache-defining columns) for which data should be cached. Under certain circumstances, an amount of data being materialized may be dynamically grown. As described below, for some parameter combinations not matching cache-defining columns, the materialized view may be ignored without being stored in the cache.

Utilization of cached views according to embodiments, leverages the lack of suitability of some materialized views for use with complex databases and searching. For example in some cases the result view, and/or the complexity of a view model, disallows materializing a sub-query without additional restrictions on predicates (e.g., client=500 and area='Korea').

Those parameters, however, are not known at the time of query compilation (when the query is matched with the materialized view). Thus, such a restriction would disallow use of the materialized view, or require multiple alternative plans to be stored.

Moreover, deferring the decision to rely upon materialized views until query runtime, is also not easily achievable. This is because a query could potentially make use of a large number of extant materialized views, thereby adding a high number of choices and complexity to the query execution time.

Accordingly, embodiments employing the cached view approach avoids these issues by relying upon a single execution plan involving multiple cached views (also referred to herein as cache instances), and a set of (pre-defined and/or incrementally growing) view-specific parameters defining the content of a cached view. Thus whenever a query potentially making use of a cached view is being executed, a corresponding cache manager component checks whether the query parameters (e.g. cache-defining columns) match an existing entry in the cache. Then, either the existing entry is used as a query result, or the corresponding subquery is evaluated dynamically.

Depending on the policy of the cached view, this new result may be stored for a subsequent query as part of the cached view, thereby dynamically growing the amount of data that is being materialized. Under some parameter conditions (e.g., where the query parameter does not match the cache-defined column), the new result may be ignored and discarded without being stored in the cache.

FIG. 1 shows a simplified view of a system configured to implement view caching according to an embodiment. The system 100 comprises an application layer 102 overlying a database layer 104. One example of a database layer is the HANA in-memory database available from SAP AG of Walldorf, Germany. An example of an overlying application is the ABAP platform also available from SAP.

The database layer includes a database 106 stored in a non-transitory computer readable storage medium 108. The database layer further comprises a database engine 110 that is configured to govern the movement of database data to and from the database. An example of such database data is that contained in a view 112 that is responsive to queries issued by the application layer to the database layer.

As described herein, under certain circumstances data available in such a view may be stored in a cache 114 for later reuse. Such reuse improves performance by reducing the processing burden incurred by having to request all data from the database directly.

In particular, the application layer also comprises an engine 116 that is configured to manage operation of the cache, including the creation of specific cache instances 118. This engine 116 is also referred to herein as a cache manager.

While the particular embodiment of FIG. 1 places the cache 114 and the cache manager 116 inside the application layer, this is not required. According to various embodiments the cache and/or cache manager could be implemented in the application layer or in the database layer.

In certain embodiments, the cache and/or cache manager could be located in an in-memory database. Processing power available to an in-memory database could be harnessed to perform caching according to various embodiments.

Examples of such in memory databases include the HANA database just mentioned, as well as the SYBASE IQ database also available from SAP AG; the Microsoft Embedded SQL for C (ESQL/C) database available from Microsoft Corp. of Redmond, Wash.; and the Exalytics In-Memory database available from Oracle Corp. of Redwood Shores, Calif.

Operation of the cache manager is now described in connection with a consumer 120 of the database data, issuing a request (query) 121 for information from the database. As described below, this query 121 may comprise one or more elements (parameters) 122 that define with specificity the information that is sought from the database.

The cache manager receives this query. The cache manager examines the query structure to determine whether it can be satisfied from an existing cache instance.

Three possible system reactions are possible. A first system outcome is to satisfy the latest request (query) from an existing cache instance. Criteria for such view matching may be where the same values occur in cache defining columns that are specified at design time, and where the same grouping occurs. This may be an explicit group-by clause, or may be a requested column list.

A second system outcome is to create a new cache instance, and to satisfy the latest request from this news cache instance. A third system outcome is to satisfy the latest request from the view retrieved from the database layer, and not build a new cache instance.

Implementation of view caching according to one specific embodiment, is now illustrated and described in connection with FIGS. 2A-2G. This embodiment relates to display of information retrieved using the HANA Studio software program available from SAP AG of Walldorf, Germany.

Figure 2A:
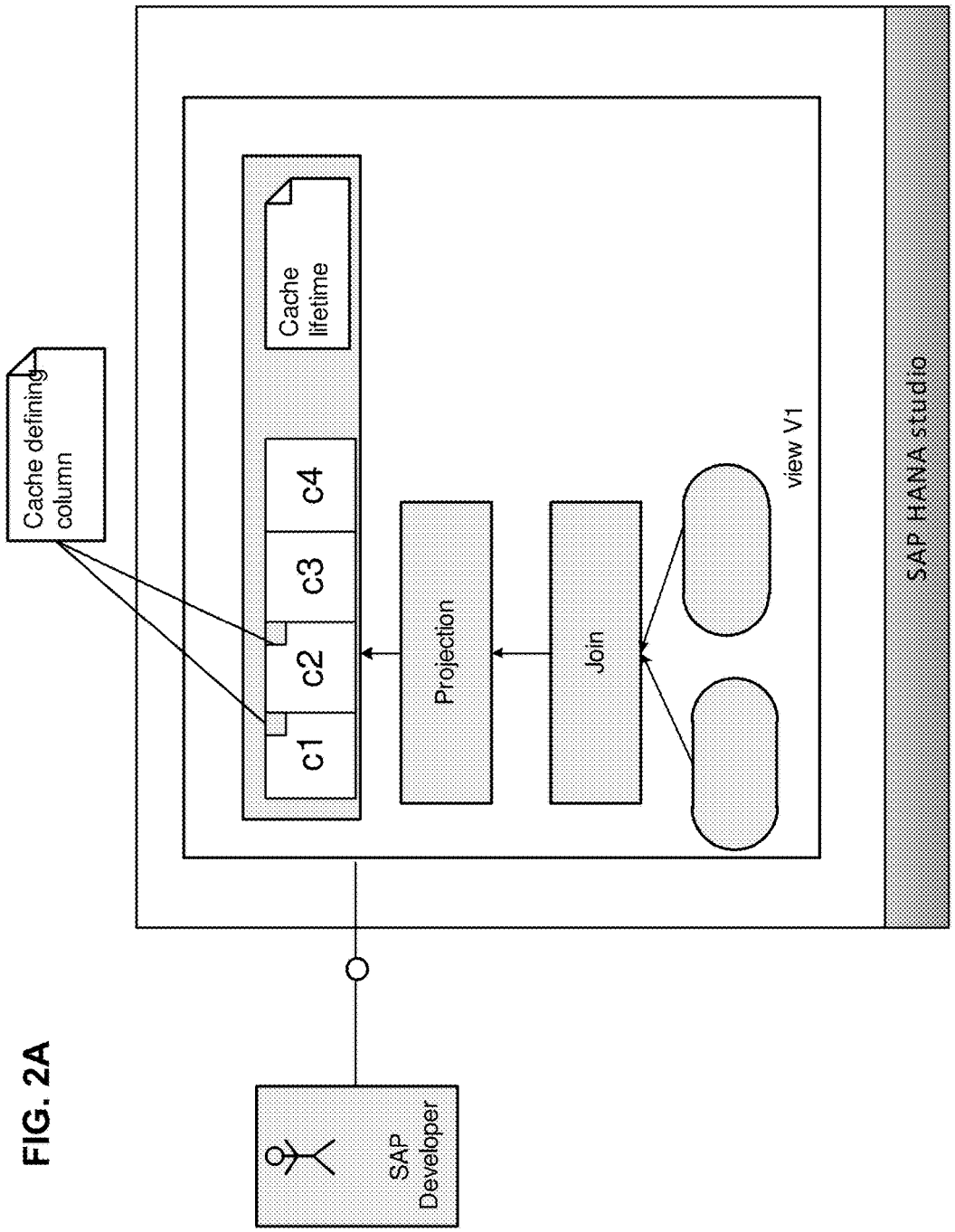
FIGS. 2A-2G illustrate one embodiment of a method of view caching.

FIG. 2A shows implementation of view caching by a developer at design time. In particular, the developer defines which columns (c#) can be used to define the selection criteria (WHERE condition, input parameter) for the cache. Here, the particular View V1 comprises a Join followed by a Projection.

Also at design time, the developer may predefine cache lifetime properties. An example of such properties would be eviction from memory of specific cache instances based upon a Least Recently Used (LRU) strategy.

Figure 2B:
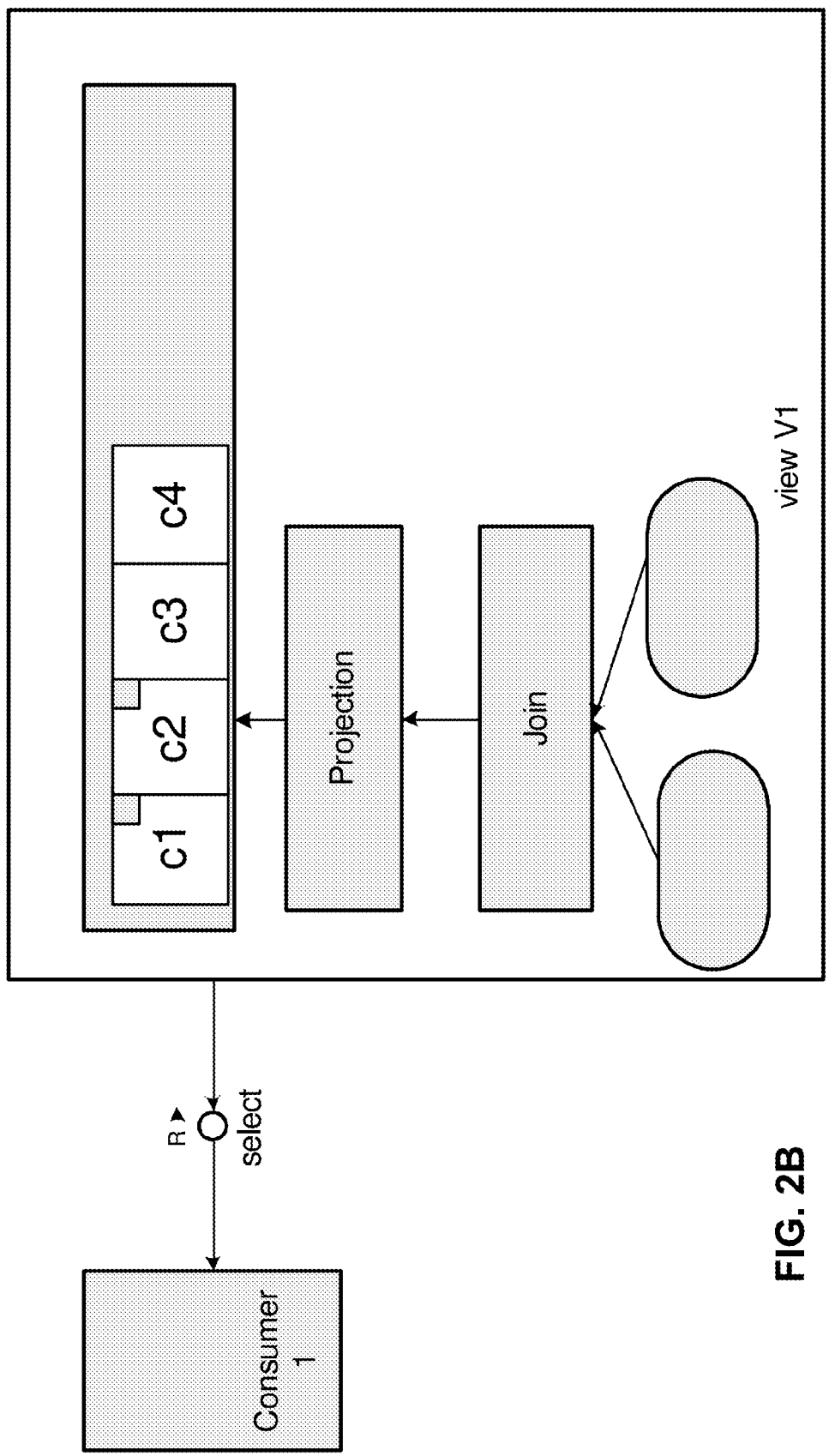
Figure 2C:
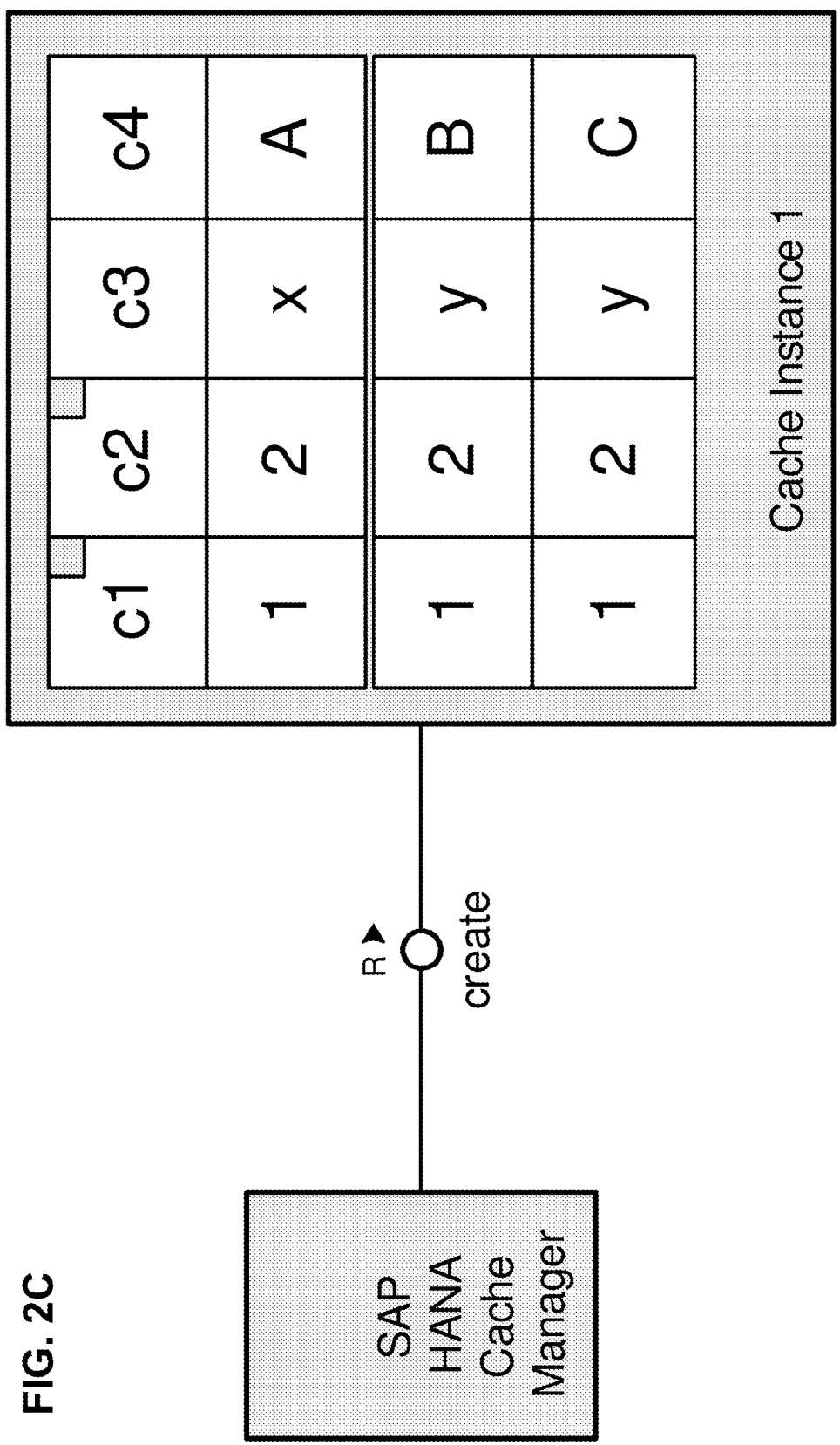
Figure 2D:
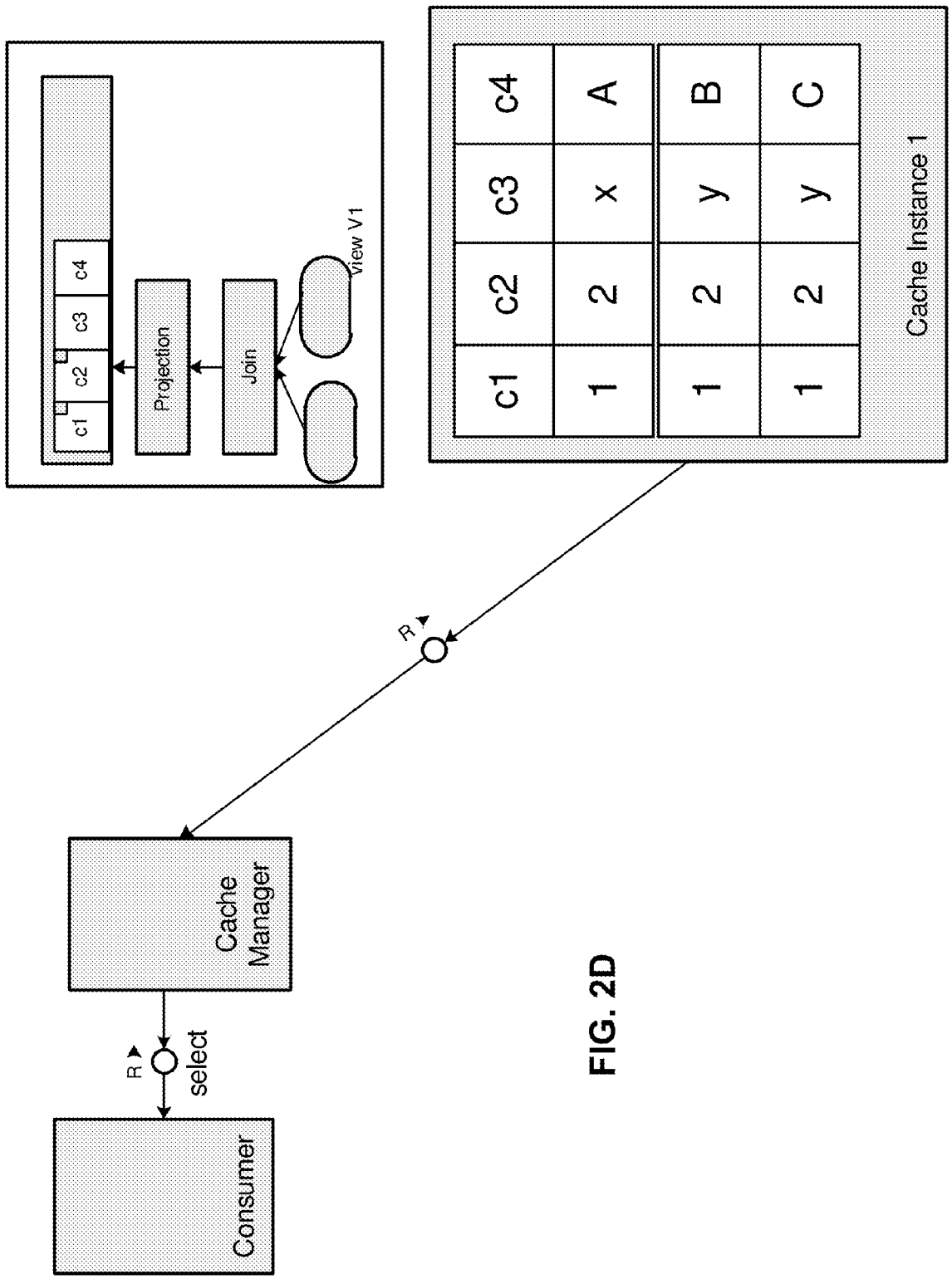

FIGS. 2B-D show the next steps taking place during runtime, with cache building occurring during consumption of the view. In particular, FIG. 2B shows Consumer 1 of the database data, running the following query against the View V1:
Select c1,c2,c3,c4 from v1
where c1='1'
and c2='2'
and c3='x'

Now, the Cache Manager recognizes that all of cache defining columns (c1, c2) are part of the where clause of this query. Because no suitable cache instance exists so far, the Cache Manager decides to build a cache.

FIG. 2C shows creation of the cache instance. In particular, this figure shows creation of the Cache Instance 1 as the result of the following operation:
select c1,c2,c3,c4 from v1
   into cache_instance_1
where c1='1'
   and c2='2'

FIG. 2D shows satisfaction of the consumer request from the cache. In particular the Cache Manager reaches into the cache to retrieve the existing intermediate result, rather than recomputing it on the fly.

Figure 2E:
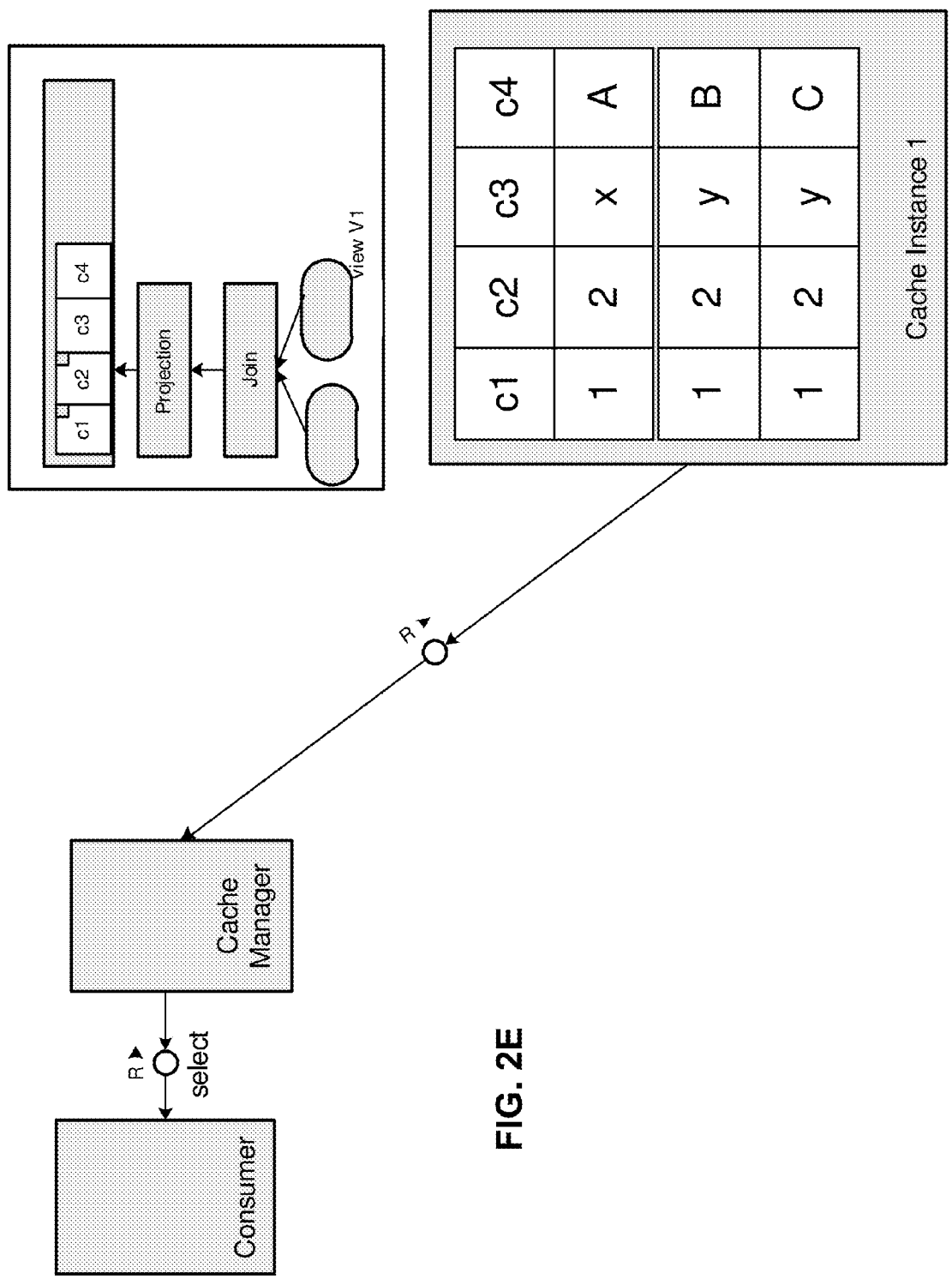

FIG. 2E shows handing of a subsequent (different) query utilizing view caching. Here, the cache manager receives the following query to run against the same View V1:
Select c1, c2, c3, c4 from v1
where c1='1'
   and c2='2'
   and c4='C'

FIG. 2E shows that the where clause of this new query contains all of the cache defining columns (c1, c2), with the same literals as in the existing cache instance. The requested column list is the same as the one for which the cache was built, and the new query can thus be satisfied from the cache.

Figure 2F:
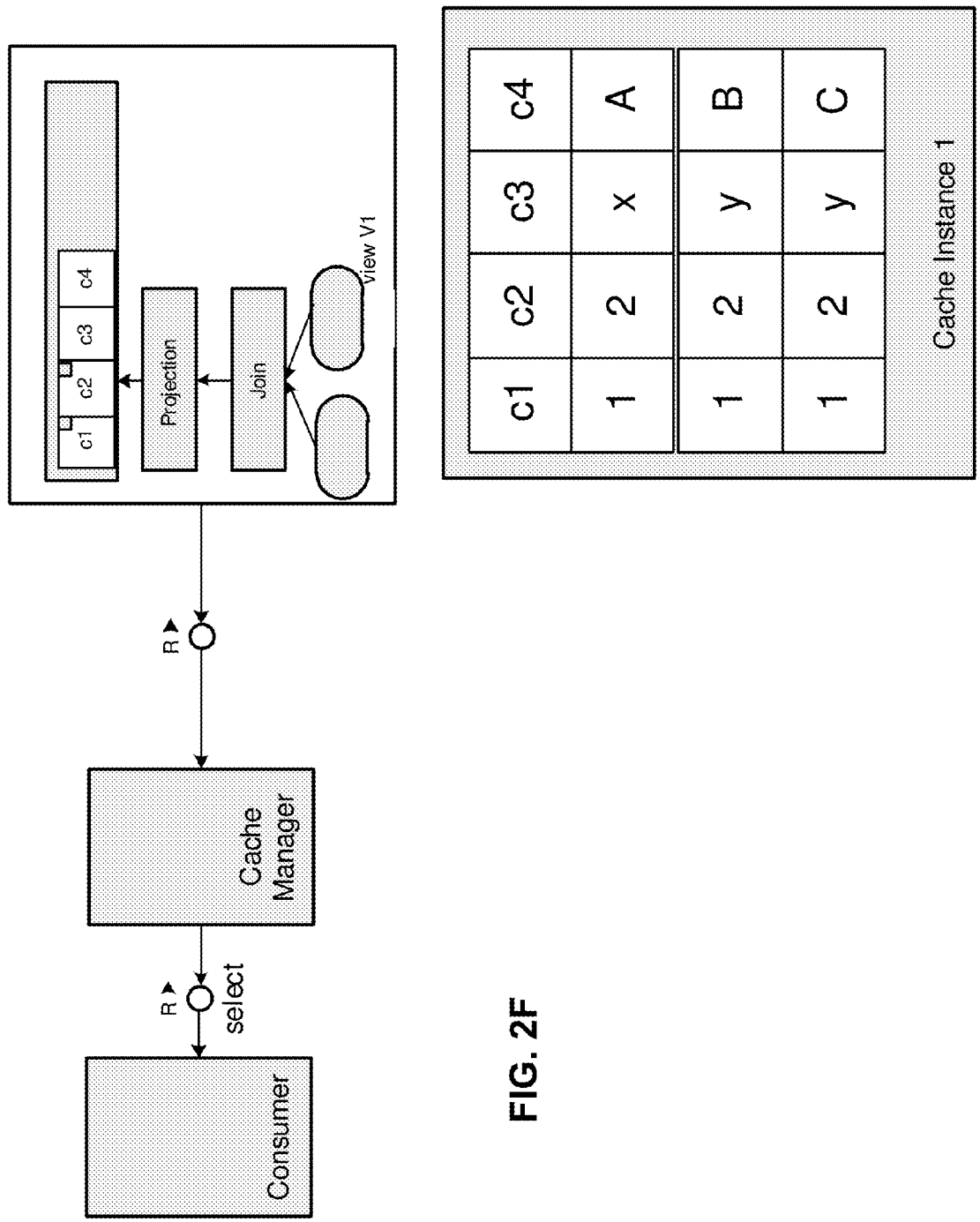

FIG. 2F shows yet another possible query being run against the View V1:
Select c1, c4 from v1
where c1='1'
   and c4='C'

Here, the where clause of this query does not contain all of the cache defining columns (i.e., c2 is not specified). Thus according to the view caching policy, the above query cannot be satisfied from the cache. The query will be satisfied by the view, and no new cache instance is built.

Figure 2G:
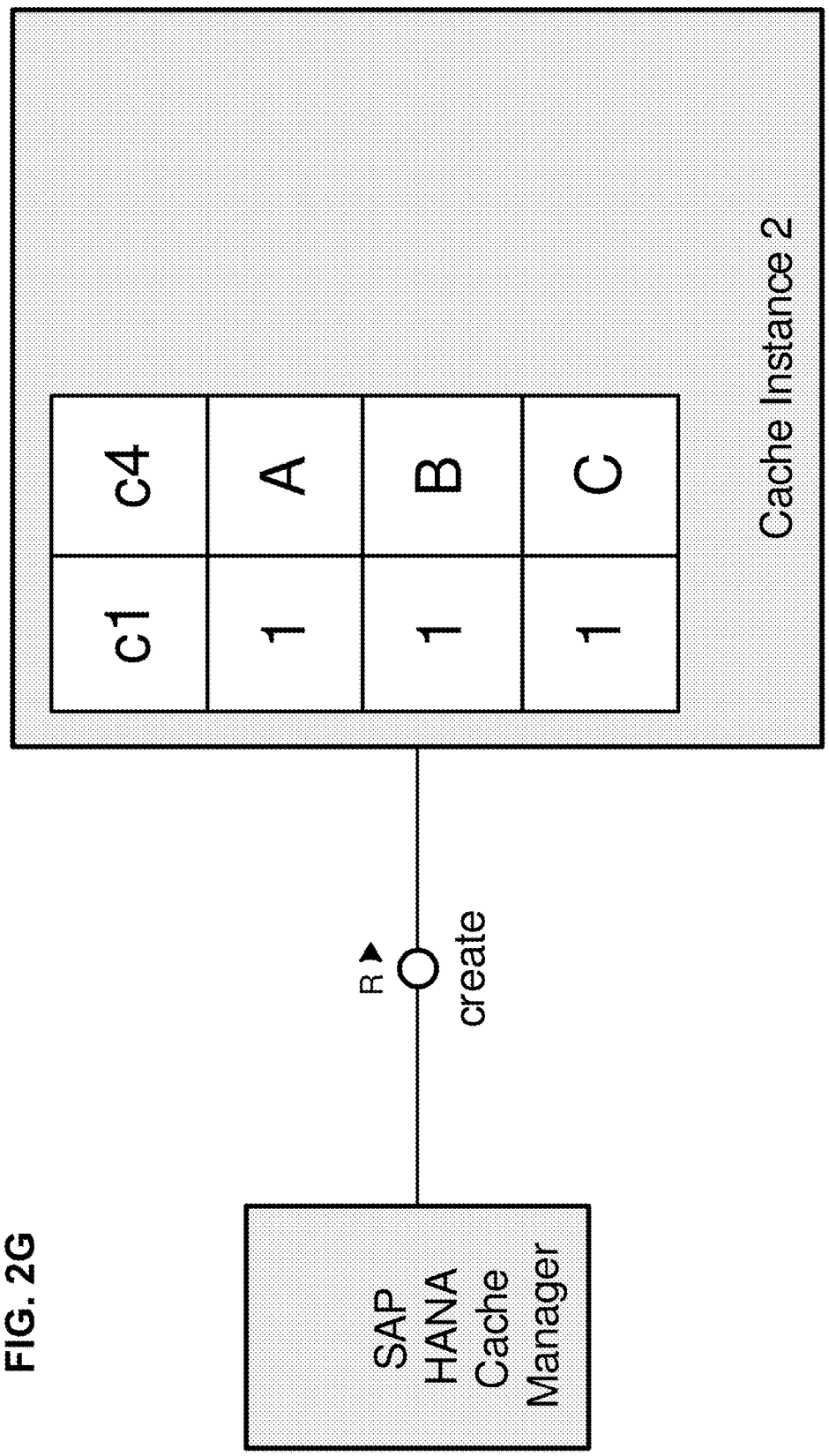

FIG. 2G shows still another subsequent query being run against the View V1:
Select c1, c4 from v1
where c1='1'
   and c2='3'
   and c4='C'

The above where clause contains all of the cache defining columns (c1, c2), but with literals that do not fit the existing cache. That is, the sole Cache Instance 1 does not include any record (row) having c1=1, c2=3, and c4=C. In addition, the requested column list is different for this query.

Accordingly, the query cannot be satisfied from the sole existing cache instance of the cache. A new Cache Instance 2 is built from the following operation:
select c1, c4 from v1
   into cache_instance_2
where c1='1'
   and c2 ='3'
FIG. 2G shows satisfaction of the latest query from this new cache instance.

Figure 3:
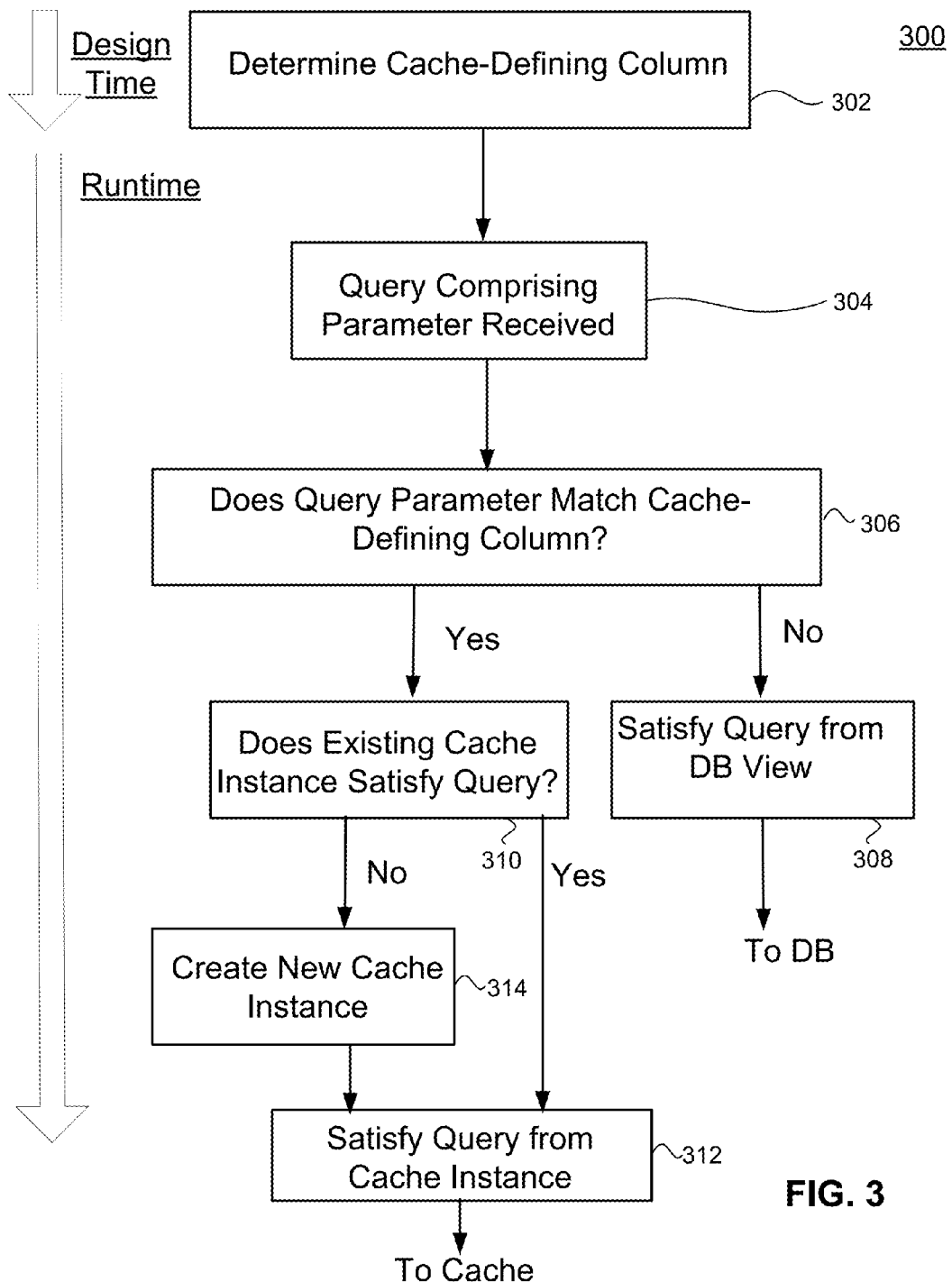
FIG. 3 is a simplified flow diagram illustrating steps of a method of view caching according to an embodiment.

View caching as described above, is now summarized in connection with the simplified flow diagram of FIG. 3. In particular, process 300 comprises a first step 302 in which a cache defining column of a view is determined at design time.

In particular, cache defining columns may be chosen such that the resultant view cache can be used for as many queries as possible. If a query requires a column that is not a cache defining one, then the query cannot benefit from the view cache.

For instance, consider a view cache that is created for columns a and b. If a query requires column a, b and c, that query cannot use the cache.

However, if a number of cache defining columns is so large as to cover a large number of columns used in entire queries, the benefit of view cache may decrease in terms of cache memory and query performance. Consider that the cache defining columns are grouping columns Then, many grouping columns produce a large number of small groups, which results in a large memory consumption for caching. Thus according to particular embodiments, cache defining columns are likely to be grouping columns During runtime, in a second step 304 a cache manager receives a query comprising a parameter. In a third step 306, the cache manager checks to see whether the parameter of the query matches the cache defining column. That is, the cache manager determines whether a literal of the query can be satisfied by a cache defining column at query execution time.

In step 308, if the parameter does not match the cache defining column, then the query is satisfied from a view obtained from the database. If, however, the parameter does match the cache-defining column, in step 310 the cache manager determines whether an existing cache instance satisfies the query.

In step 312, if the cache instance exists, it is used to provide a query result. No recourse to the database to obtain a view is required.

If no cache instance exists, in step 314 a new cache instance is created. That new cache instance is then used to satisfy the query.

EXAMPLE

A specific example of the implementation of view caching is now described in connection with FIG. 4. In particular, FIG. 4 shows the cache comprising columns showing dimensions (characteristics) and columns showing measures (key figures).

Step 1. of FIG. 4 shows filling in rows of the cache, for where Client=900 and Country='DE', group by Client, Country, Period. Such cached information can be used for a query with: 1) less or equal grouping columns (depending on the aggregation function used); and 2) more or equal filters. A first example is where Client=900 and Country='DE', group by Client, Country. A second example is where Client=900 and Country='DE' and Period=201301, group by Client, Country.

As mentioned above, the grouping columns depend upon the aggregation functions used. If they are not composable, then the grouping columns must be equal. As an example, MEDIAN is an aggregation function that is not composable, but SUM, MIN, COUNT are.

Step 2. shows filling in additional rows of the cache. Here, the cache is filled for where Client=900 and Country='KR', group by Client, Country.

Step 3. shows still further filling in of additional rows of the cache. Here, the cache is filled for where Client=900, group by Client, Period.

Step 4. shows a situation of a posed query where Client=900 and Product='ERP' and Period IN (201301, 201302, 201303), group by Client, Product, Period. A query is run to get the result shown. Then, add to the cached view.

It is noted that this example also shows how incremental caching works. Such incremental caching can address the issue of having many cache defining columns, as mentioned above.

Step 5. shows a query with where Client =900 group by Country. A query is run to get the result shown. Then, do UPSERT.

It is noted that full SQL and HANA column views are covered for the queries. While in some embodiments view matching may be based on a name of the cached view. However embodiments could also work for an exact match of the matched view and with a limitation of more general matching.

It is also noted that the decision to use the cache or not, may be based on a relative cost. That is, under certain circumstances a cost (e.g., processing) of creating a cache may outweigh a benefit of using it. Thus in certain embodiments a cost factor may be calculated and considered in deciding whether or not to create a cache/cache instance.

Figure 5:
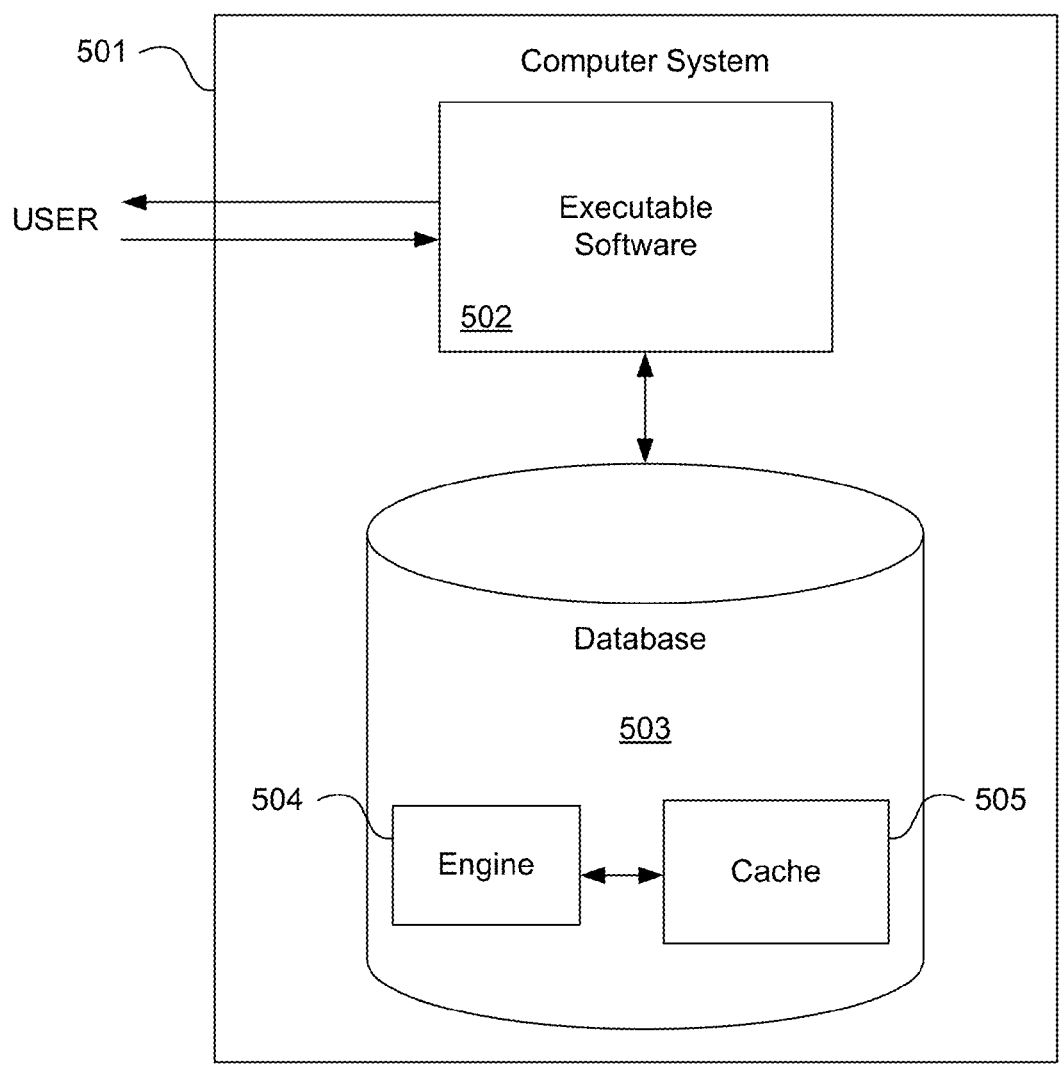
FIG. 5 illustrates hardware of a special purpose computing machine configured to implement view caching according to an embodiment.

FIG. 5 illustrates hardware of a special purpose computing machine configured to perform view caching according to an embodiment. In particular, computer system 501 comprises a processor 502 that is in electronic communication with a non-transitory computer-readable storage medium 503. This computer-readable storage medium has stored thereon code 505 corresponding to a cache. Code 504 corresponds to a query manager engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 6:
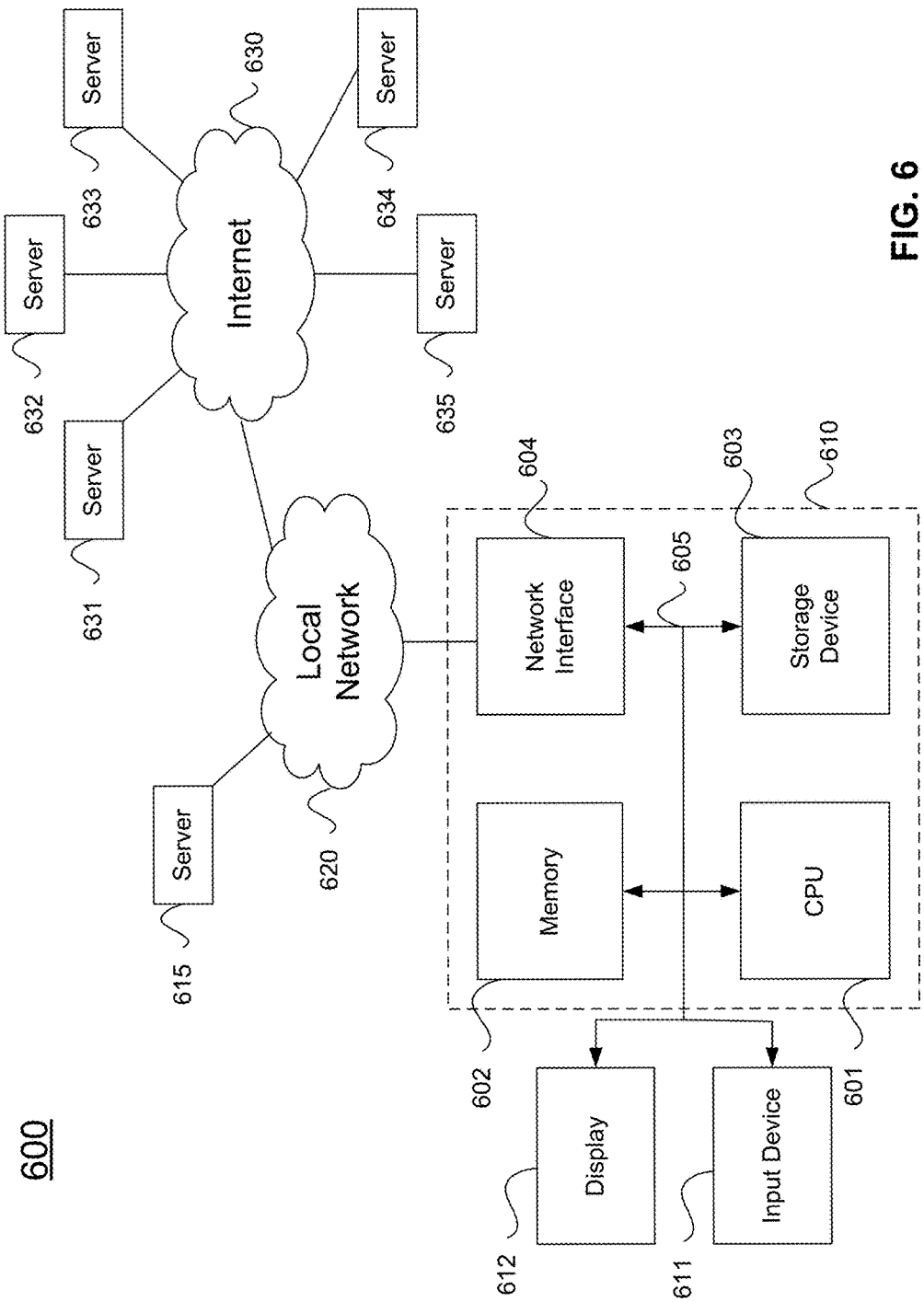
FIG. 6 illustrates an example of a computer system.

An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how certain aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, and implementations may be employed.

What is claimed is:

1. A method comprising:
   an engine of an in-memory database storing in the in-memory database, a cache view comprising an existing cache instance including a plurality of cache defined columns and a grouping;
   the engine receiving a query including parameters comprising a MEDIAN aggregation function that is not composable;
   the engine determining when the parameters match all of the cache-defined columns and the grouping;
   when a parameter does not match all of the cache-defined columns and the grouping, returning a query result satisfied by a view from an underlying database;
   when the parameters match all of the cache-defined columns and the grouping, the engine determining when the existing cache instance satisfies the query;
   when the existing cache instance does not satisfy the query, the engine creating a new cache instance with a view from the underlying database to add to the cache view, and returning the query result with the new cache instance, wherein the new cache instance is created for each tuple of literals for all of the cache-defined columns, and wherein the new cache instance is grown incrementally from another query utilizing an UPSERT function;

when the existing cache instance satisfies the query and the cache-defined columns are equal, the engine returning the query result with the existing cache instance, wherein the existing cache instance satisfies the query when a same explicit group-by clause is used for the grouping.

2. The method as in claim 1 wherein the existing cache instance satisfies the query when a same requested column list is used for the grouping.

3. The method as in claim 1 further comprising evicting the existing cache instance after a period of time.

4. The method as in claim 3 wherein the evicting is based upon a Least Recently Used (LRU) strategy.

5. The method as in claim 1 further comprising:
   the engine calculating a cost factor of creating the new cache instance; and
   the engine considering the cost factor in deciding to create the new cache instance.

6. A non-transitory computer readable storage medium embodying a computer program for performing a method, said method comprising:
   an engine of an in-memory database storing in the in-memory database, a cache view comprising an existing cache instance including a plurality of cache defined columns and a grouping;
   the engine receiving a query including parameters comprising a MEDIAN aggregation function that is not composable;
   the engine determining when the parameters match all of the cache-defined columns and the grouping;
   when a parameter does not match all of the cache-defined columns and the grouping, returning a query result satisfied by a view from an underlying database;
   when the parameters match all of the cache-defined columns and the grouping, the engine determining when the existing cache instance satisfies the query;
   when the existing cache instance does not satisfy the query, the engine creating a new cache instance with a view from the underlying database to add to the cache view, and returning the query result with the new cache instance, wherein the new cache instance is created for each tuple of literals for all of the cache-defined columns, and wherein the new cache instance is grown incrementally from another query utilizing an UPSERT function;
   when the existing cache instance satisfies the query and the cache-defined columns are equal, the engine returning the query result with the existing cache instance, wherein the existing cache instance satisfies the query when a same explicit group-by clause is used for the grouping.

7. The non-transitory computer readable storage medium as in claim 6 wherein the existing cache instance satisfies the query when a same requested column list is used for the grouping.

8. The non-transitory computer readable storage medium as in claim 6 further comprising evicting the existing cache instance after a period of time.

9. The non-transitory computer readable storage medium as in claim 8 wherein the evicting is based upon a Least Recently Used (LRU) strategy.

10. The non-transitory computer readable storage medium as in claim 6 further comprising:
    the engine calculating a cost factor of creating the new cache instance; and
    the engine considering the cost factor in deciding to create the new cache instance.

11. A computer system comprising:
    one or more processors;
    a software program, executable on said computer system, the software program configured to instruct an engine of an in-memory database to:
    store in the in-memory database, a cache view comprising an existing cache instance including a plurality of cache defined columns and a grouping;
    receive a query including parameters comprising a MEDIAN aggregation function that is not composable;
    determine when the parameters match all of the cache-defined columns and the grouping;
    when a parameter does not match all of the cache-defined columns and the grouping, return a query result satisfied by a view from an underlying database;
    when the parameters match all of the cache-defined columns and the grouping, the engine determining when an existing cache instance satisfies the query;
    when the existing cache instance does not satisfy the query, the engine creating a new cache instance with a view from the underlying database to add to the cache view, and return the query result with the new cache instance, wherein the new cache instance is created for each tuple of literals for all of the cache-defined columns, and wherein the new cache instance is grown incrementally from another query utilizing an UPSERT function;
    when the existing cache instance satisfies the query and the cache defining columns are equal, the engine returning the query result with the existing cache instance, wherein the existing cache instance satisfies the query when a same explicit group-by clause is used for the grouping.

12. The computer system as in claim 11 further comprising evicting the existing cache instance after a period of time.

13. The computer system as in claim 11 further comprising:
    the engine calculating a cost factor of creating the new cache instance; and
    the engine considering the cost factor in deciding to create the new cache instance.

14. The computer system as in claim 11 wherein the existing cache instance satisfies the query when a same requested column list is used for the grouping.

* * * * *